United States Patent [19]
Bowser et al.

[11] Patent Number: 5,382,364
[45] Date of Patent: Jan. 17, 1995

[54] PROCESS FOR REMOVING ALCOHOL FROM LIQUIDS

[75] Inventors: John Bowser, Newark, Del.; John Dennison, Elkton, Md.

[73] Assignee: W. L. Gore & Associates, Inc., Newark, Del.

[21] Appl. No.: 32,542

[22] Filed: Mar. 17, 1993

Related U.S. Application Data

[63] Continuation of Ser. No. 783,062, Oct. 25, 1991, abandoned.

[51] Int. Cl.⁶ .............................................. B01D 61/36
[52] U.S. Cl. ................................ 210/640; 210/500.36
[58] Field of Search .................... 55/16, 158; 210/640, 210/195.2, 644, 500.36; 426/14, 493, 494, 474, 475

[56] References Cited

U.S. PATENT DOCUMENTS

| | | |
|---|---|---|
| 4,187,390 | 2/1980 | Gore. |
| 4,268,279 | 5/1981 | Shindo et al. ............... 55/158 X |
| 4,581,236 | 4/1986 | Bandel et al. ............... 426/14 |
| 4,728,431 | 3/1988 | Nagura et al. ............... 210/640 |
| 4,781,837 | 11/1988 | Lefebvre ....................... 210/640 |
| 4,983,303 | 1/1991 | Uragami ....................... 210/640 |
| 5,066,403 | 11/1991 | Dutta et al.. |
| 5,076,932 | 12/1991 | Taylor ........................... 210/640 |
| 5,143,526 | 9/1992 | Lee et al. ................... 210/195.2 X |

FOREIGN PATENT DOCUMENTS

| | | |
|---|---|---|
| 64-23882 | 1/1989 | Japan. |
| 3-30663 | 2/1991 | Japan. |
| 389922 | 4/1991 | Japan. |
| WO87/02380 | 4/1987 | WIPO. |

OTHER PUBLICATIONS

Membrane Separation Systems, R. W. Baker, et al., 1991, Noyes Data Corporation.
Abstract –J03030663, Preparation Low High Alcohol Drink Induce Movement Drink Hydrophobic Membrane PTFE Temperature Differ Drive Force.
Abstract –J61035805, Continuous Process Alcoholic Fermentation Solution Thermo Pervaporation Hydrophobic Porous Membrane PTFE.
Abstract –J61064306, Select Permeable High Molecular Weight Membrane Poly di Methyl Siloxane Poly di Phenyl Siloxane Separate Liquid . . . .
International Search Report, PCT Article 18 and Rule 43 & 44, Jul. 1992.
Membrane Handbook, edited by W. S. Winston Ho., Ph.D. and Kamalesh K. Sirkar, Ph.D., Van Nostrand Reinhold, New York.
"Membrane Separation Systems", by R. W. Baker, et al., pp. 154–156.

*Primary Examiner*—Frank Spear
*Attorney, Agent, or Firm*—Gary A. Samuels

[57] ABSTRACT

This invention utilizes the partial pressure difference of alcohol in two areas separated by a microporous membrane wherein one area contains a solution of alcohol and at least one other liquid and the other area contains predominately only the other liquid to cause the alcohol to migrate through the membrane.

8 Claims, 2 Drawing Sheets

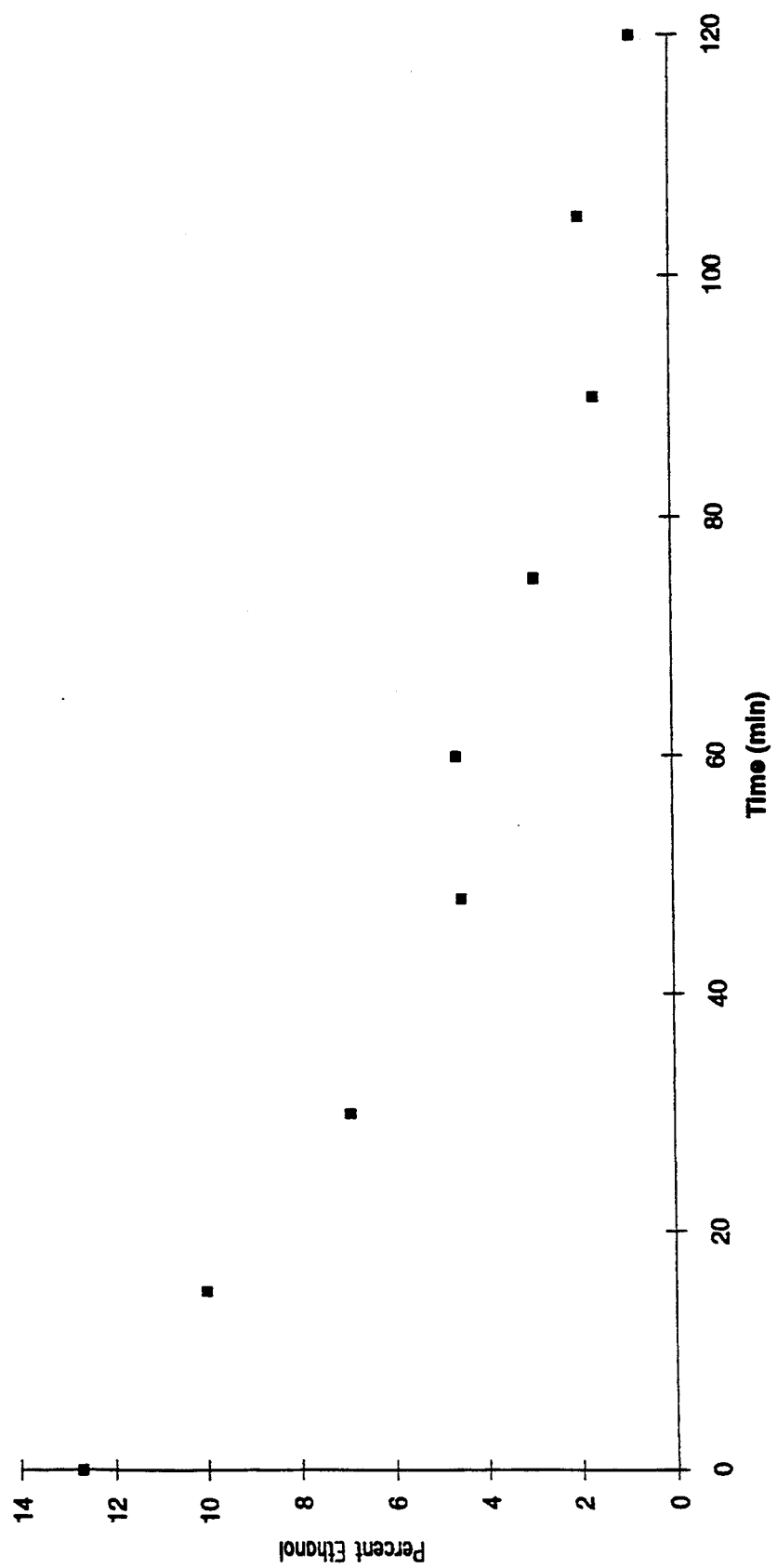

PROCESS FOR REMOVING ALCOHOL FROM LIQUIDS

This is a continuation of Ser. No. 07/783,062, filed on Oct. 25, 1991, now abandoned.

FIELD OF THE INVENTION

This invention relates to reduction of alcohol content in liquids.

BACKGROUND OF THE INVENTION

With the growing consciousness in many countries of the adverse effects of alcohol, with greater restrictions on drunken driving and underage drinking, and in some cases with legal or religious restrictions, many beverage manufacturers have recognized a market for low or near zero alcohol content wines, beers, and other fermented drinks. To achieve the full flavor of a beer or varietal wine, it is necessary to manufacture the alcoholic beverage and then remove the ethanol, while preserving as much as possible of the remainder of the flavor components. It is this last aspect that makes most technologies for removing alcohol less than satisfactory. In particular, processes that require heating of the beverage either change the nature of some of the flavor components or drive off the volatile essences that provide the flavor.

Various means have been used in the past to separate alcohol from liquids. For example, reverse osmosis has been used but is disadvantageous in that high pressures must be used and the separation process is one involving liquid phase transfer across a barrier causing water loss as well.

Dialysis has been used in U.S. Pat. No. 4,581,236. The transfer membrane in dialysis is one that generally permits passage of small molecules but not large ones. Transfer does not occur in the vapor phase and some flavor components pass through the membrane in addition to the alcohol.

U.S. Pat. No. 4,781,837 covers a process identified as osmotic distillation. This patent does not teach removal of alcohol from an aqueous solution; but, describes the use of a porous hydrophobic barrier to transfer, in vapor phase, a solvent from a liquid of lower osmotic pressure to a liquid of higher osmotic pressure. When applied to fermented liquids, water in fermented liquids passes through in addition to the alcohol, necessitating re-adding water to the concentrated fermented liquid. Furthermore, the osmotic pressure differential is attained by using a brine solution which can contaminate the fermented liquid should a hole develop in the barrier. It would be beneficial to provide a simple, straightforward procedure for separating alcohol from liquids.

SUMMARY OF THE INVENTION

In its broadest aspect, the process of the invention utilizes the partial pressure difference of alcohol at the gas/liquid interfaces of two areas separated by a microporous membrane wherein one area contains a solution of alcohol and at least one other liquid and the other area contains predominately only the other liquid.

In a narrower aspect, the partial pressure of ethanol in the gaseous phase above a fermented liquid is used to drive the ethanol through the pores of a microporous hydrophobic membrane into an area of lower ethanol partial pressure. Thus, in a narrower aspect, this invention is a process for reducing the ethanol content of fermented liquids, which comprises passing a fermented liquid along one side of a microporous hydrophobic membrane, simultaneously passing liquid water along the other side of said membrane, said liquid water containing less ethanol content than the content in the fermented liquid, thus creating a difference in the partial pressure of the alcohol across the membrane.

BRIEF DESCRIPTION OF THE DRAWINGS

FIG. 2 is graph plotting concentration of alcohol in wine versus time.

DETAILED DESCRIPTION OF THE INVENTION

Figure 1:
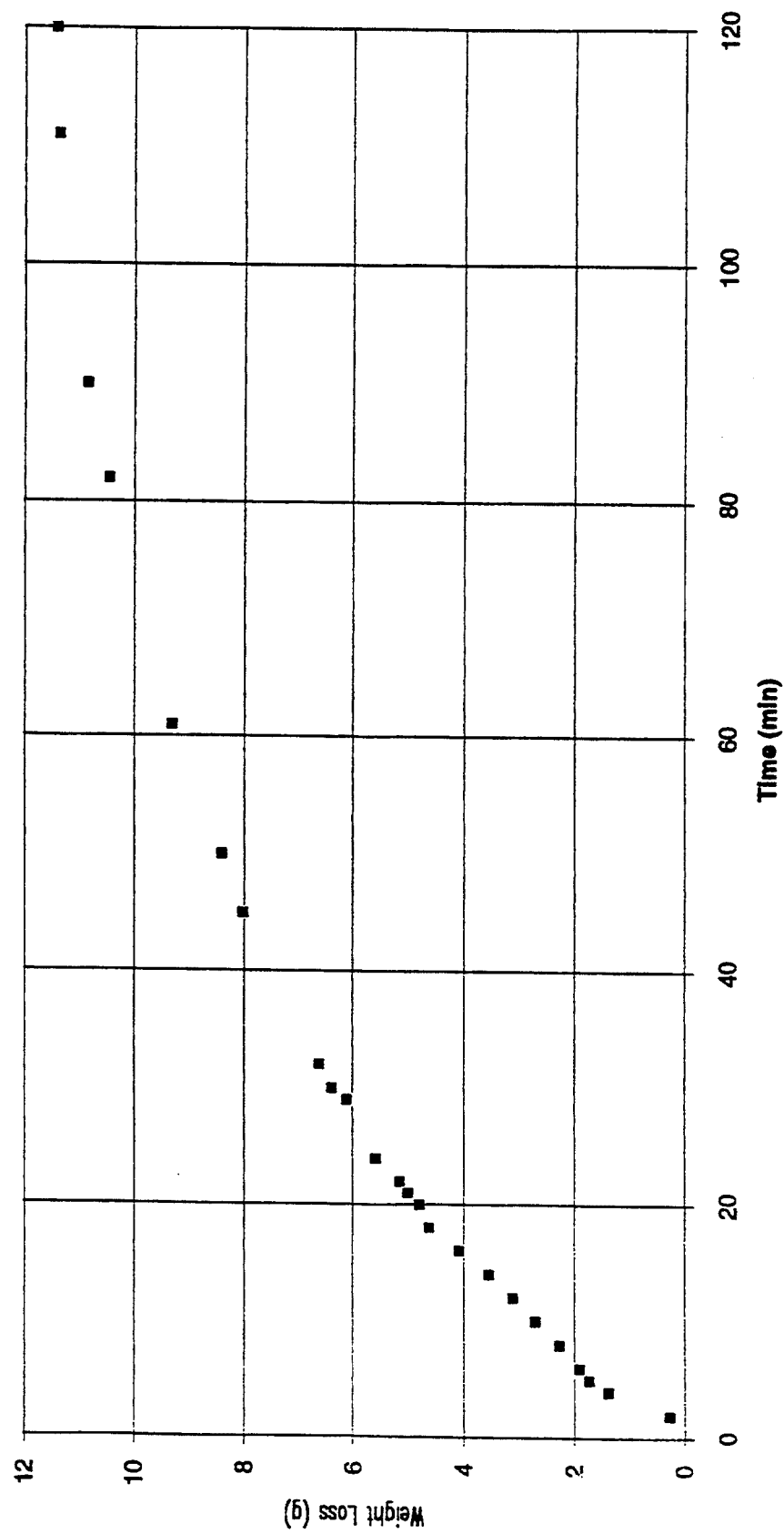
FIG. 1 is graph plotting weight loss of wine versus time.

In the process of the invention, the partial pressure difference of an alcohol across a membrane having micropores is utilized to move alcohol vapor out of liquid on one side that has a higher concentration of alcohol than in liquid on the other side, and move the alcohol into the liquid on the other side. In order to maximize the partial pressure differential, it is preferred to have both liquids move continuously along either side of the separating membrane. The rate of flow is not critical, but clearly, to keep the alcohol content of the receiving liquid low, it should flow at a rapid rate.

The invention will now be described in relation to the separation of alcohol from a fermented liquid, such as beer or wine.

Fermented liquid is passed along the membrane wall of a microporous, hydrophobic membrane, at the same time liquid water is passed along the opposite wall of the membrane, whereupon alcohol vapor escapes from the fermented liquid and passes through the pores of the microporous membrane and into the liquid water on the other side.

The microporous hydrophobic membrane is a substantially liquid-waterproof membrane. By "hydrophobic" is meant substantially liquid-waterproof. It can be made from fluoropolymers such as polytetrafluoroethylene (PTFE), fluorinated copolymers of TFE, such as TFE and perfluoroalkyl vinyl ether (PFA type) copolymers, and polyvinylidine fluoride, or polyolefins such as polypropylene or polyethylene, polyesters such as polyethylene terephthalate, etc. These membranes can be prepared by processes known in the art such as stretching, filler extraction, fibering, etc. They can be hydrophilic membranes such as acrylic, cellulose acetate, etc. which have been treated to be hydrophobic. The membrane can be laminated to 1 or 2 support layers. The membrane can be in the shape of a sheet, a tube, or a hollow fiber. A preferred microporous, hydrophobic membrane is expanded porous polytetrafluoroethylene prepared as described in U.S. Pat. No. 4,187,390 and U.S. Pat. No. 3,953,566.

The porosity and the thickness of the membrane will affect the flux rate of alcohol through it, but are otherwise not critical parameters. In general, the greater the porosity the greater the flux rate. In general, the porosity will range between 30 and 95% by volume. In general, also, the thinner the membrane, the greater the flux rate. The thickness of the membrane can vary as desired, and generally will be between 10 and 1000 micrometers.

Size of the micropores is not critical, so long as the membrane is resistant to liquid penetration by the liquids in use at the pressures employed.

The apparatus used can be any conventional apparatus for separating liquids, such as a plate and frame membrane cell or spiral wound membrane module or tubular or hollow fiber module. The ensuing description will describe the process in terms of a plate and frame membrane cell.

The two cells of the apparatus are separated by the membrane in fluid-tight manner. Inlet and outlet passages are used to introduce and regulate flow of liquids. In one cell (first cell), the fermented liquid, such as beer or wine, is passed through and in the other cell (second cell), liquid water, which may be degassed, is passed. The cell walls may be made of any conventional metallic or plastic material.

In operation, an alcoholic fermented beverage is passed through the inlet of the first cell and caused to flow in contact with and along the membrane wall. At the same time, liquid water is passed through the inlet of the second cell and caused to flow in contact with and along the opposite membrane wall.

The membrane, since it is not wetted internally, and is porous, provides a thin layer of gaseous space through which the liquids cannot pass due to the nature of the membrane. However, the alcohol can evaporate into this gas layer, pass through the membrane, be absorbed into the water, and be carried away. The driving force for the alcohol to cross the membrane is the difference in partial pressure of alcohol in the gaseous phase above the wine as opposed to above the water, which is low since there is no, or very little, alcohol in the water.

After passing through the outlet of the first cell, the result is a wine product with little change in volume and composition, except for a lowered alcohol content. The alcohol can be economically separated from the liquid water passing through the outlet of the second cell by fractional distillation, pervaporation or other method. The water may then be recycled if desired.

The alcohol flux rate across the membrane may be enhanced by degassing the water prior to entry into the second cell.

The flow rate of the liquids on either side of the membrane is not critical. The flow rate, however, should not be so low that alcohol content in the liquid water side builds up to any appreciable extent, as that will decrease the difference in partial pressure of alcohol across the membrane.

Conversely, the faster the flow rate, the quicker alcohol is carried away in the liquid water side. Furthermore, the fermented beverage side should not stay in contact with the membrane too long, so as to minimize migration of other ingredients that give the fermented liquid body and flavor.

A small amount of water vapor may migrate in the opposite direction of the alcohol migration, since there is a somewhat higher vapor pressure of water above pure water than above the fermented liquid. If it is desired to prevent this small amount of water transfer from occurring, a number of electrolytes, such as NaCl, can be added to the liquid water to balance the water vapor pressure. It is not necessary to add enough electrolyte to raise the "osmotic pressure" of this solution above that of the wine. Alternatively, using cooler liquid water will achieve the same purpose. Likewise, if any other component of the wine, such as a volatile flavor component, is desired to be prevented from passing across the membrane into the water it is only necessary to add to the water the proper amount of that component.

It is a beneficial attribute of the invention that no pressure differential need be employed across the membrane. Nor is any temperature differential needed to operate the process, also a benefit, although some differential may be applied, if desired, with the fermented liquid side higher, in order to speed up the procedure.

EXAMPLE

The apparatus used was a plate and frame cross-flow membrane cell made by Osmonics Company (SEPA CF Membrane Cell). It comprises two cells separated by a membrane with an effective 0.0155 $m^2$ surface area.

The membrane used was a hydrophobic microporous expanded polytetrafluoroethylene membrane available from W. L. Gore & Associates having a minimum isopropyl alcohol bubble point of 12.3 psig (0.85 bar) as determined by ASTM F-316-86.

Water used was water that had been purified by reverse osmosis.

The fermented liquid used was a white wine having an alcohol content of about 12 percent by volume (Franzia Chardonnay).

The wine and the water were each poured into separate beakers. 150 gm of wine was placed in one beaker and 1500 ml of water were placed in another beaker. Each beaker was connected by tubing to the membrane cell and to an appropriate fluid pumping device, so that one liquid flowed through the bottom cell body and the other liquid flowed through the top cell body, the two cells being separated by the membrane. Flow of each liquid through the top and bottom cell bodies was concurrent flow at a rate of 220 ml/minute.

The beaker holding the wine was placed on a digital balance so that its weight could be continually monitored, thus providing an indication of the weight loss due to transfer of alcohol across the membrane and into the water side of the membrane cell.

The liquids were cycled continuously for a period of two hours.

Weight loss (mass loss) of the wine is plotted in FIG. 1. As seen in FIG. 1, over the two hour period, about 11.2 gm weight loss occurred.

Concentration of alcohol in the wine by volume, measured by gas chromatography, is plotted in FIG. 2.

We claim:

1. Process for reducing the alcohol content in a first mixture of miscible liquids, one of which is alcohol, which comprises passing a first mixture containing alcohol along one side of an expanded polytetrafluoroethylene microporous hydrophobic membrane having a pore volume of at least 30%; and simultaneously passing a second liquid, absent the alcohol, along the other side of said expanded polytetrafluoroethylene microporous hydrophobic membrane, such that alcohol in the gaseous phase is transferred from the first mixture through the micropores of said expanded polytetrafluoroethylene microporous hydrophobic membrane into solution in the second liquid by the partial pressure differential of the alcohol across a vapor space defined by said expanded polytetrafluoroethylene microporous hydrophobic membrane that exists between the first mixture and the second liquid.

2. The process of claim 1, wherein said hydrophobic membrane is a substantially flat expanded polytetrafluoroethylene membrane having a porosity greater than 30% volume.

3. The process of claim 1, wherein the second liquid is a mixture of substantially the same miscible liquids as said first mixture, absent the alcohol.

4. The process of claim 3, wherein the second liquid is a mixture including water.

5. The process of claim 4, wherein the second liquid mixture also includes a water soluble component at a concentration lower than that necessary to achieve an osmotic pressure higher than that of said first mixture.

6. The process of claim 5, wherein the first mixture is a fermented liquid.

7. The process of claim 4, wherein the water soluble component is a water soluble salt at a concentration lower than that necessary to achieve an osmotic pressure higher than that of said first liquid mixture.

8. Process according to claim 1, wherein said second fluid is water.

* * * * *